Patented July 26, 1949

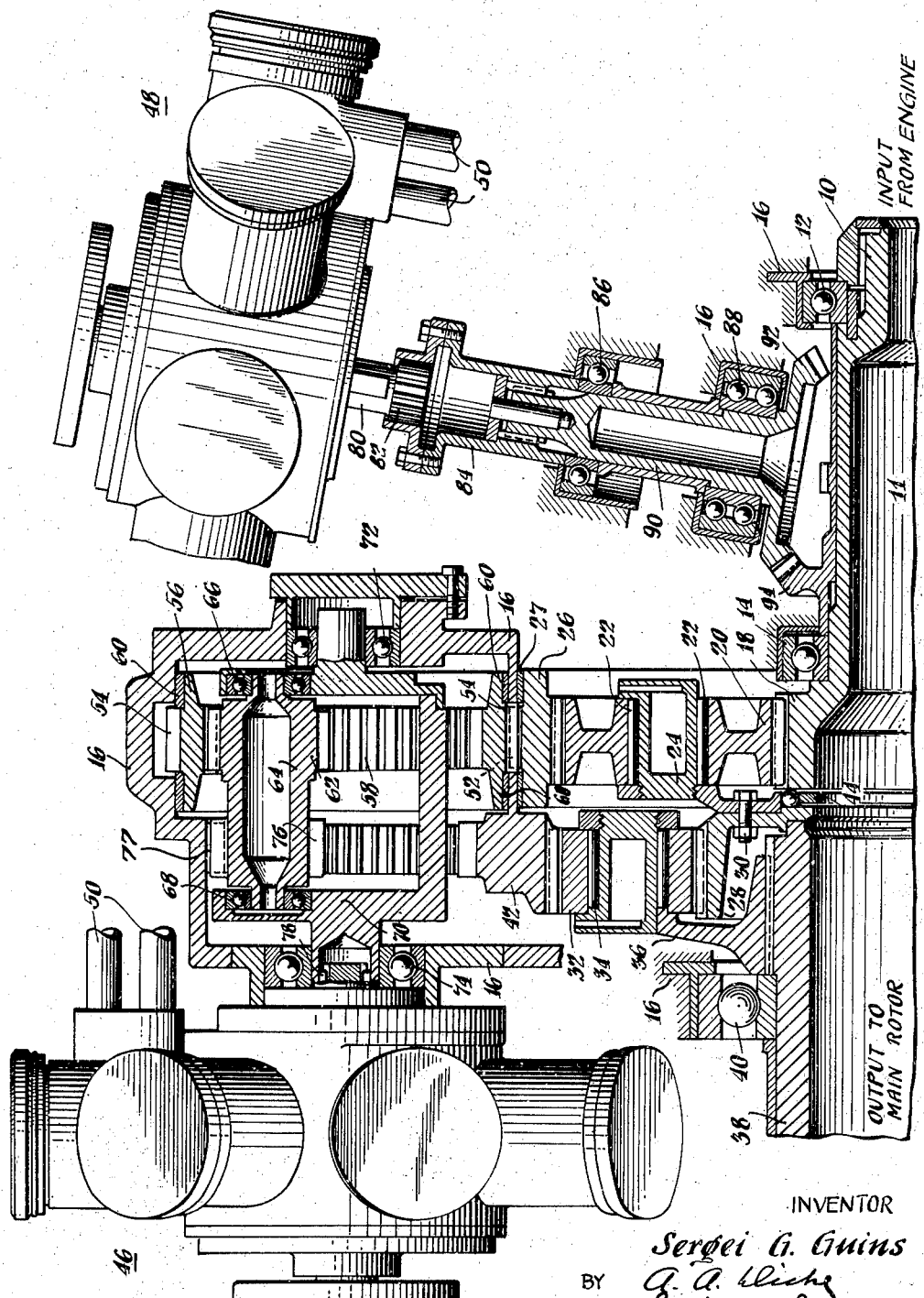

2,477,451

UNITED STATES PATENT OFFICE 2,477,451

REDUCTION DRIVE MECHANISM WITH POWER FEEDBACK

Sergei G. Guins, Stamford, Conn., assignor to The Acrotorque Company, Stamford, Conn., a corporation of Connecticut Application October 16, 1945, Serial No. 622,571

1 Claim. (Cl. 74—189.5)

This invention relates to a driving mechanism, particularly to a helicopter drive, and has for an object to provide a hydro-mechanical transmission adapted for controlling the speed of the main rotor of a helicopter without substantial dissipation of energy.

Another object of the invention is to provide an improved hydro-mechanical power-splitting arrangement for controlling the speed of a helicopter.

A further object of the invention is to provide an improved hydro-mechanical arrangement for controlling the speed of a helicopter without substantial loss of energy.

Yet a further object of the invention is to provide an improved hydro-mechanical power transmission capable of varying the angular velocity ratio between the input and output members.

A still further object of the invention is to provide an improved drive in which the driving shaft is driven at constant speed while the driven shaft is maintained at preselected speeds.

With the above objects in view, one embodiment of the invention discloses a portion of a helicopter driving mechanism in which the input and output shafts are interconnected by a double planetary gear train having the cage of one planetary train fixedly coupled to the sun gear of the second planetary train and the cage of the second planetary train fixedly coupled to the output shaft, the sun gear of the first planetary train being rigidly connected to the input shaft. For varying the output shaft speed, the ring gear of the first planetary train is coupled through a reduction gear train to a variable hydraulic transmission comprising a fixed hydraulic unit and a variable hydraulic unit, the latter unit of which is also geared to the input shaft. By varying the stroke of the variable hydraulic unit, the movement imparted to the ring gear of the first planetary train may be varied, so that the speed of the output shaft is correspondingly varied. In other words at predetermined stroke settings (except zero stroke) of the variable hydraulic unit the first planetary ring gear will be rotated by the input shaft at predetermined speeds to drive the fixed hydraulic unit as a pump, thereby converting reduction in output shaft speed to torque. The pump, in turn, drives the variable hydraulic unit as a motor, which delivers the otherwise wasted power to the input shaft.

A more complete understanding of the invention will be obtained from the detailed description which follows and by reference to the appended drawing which shows a view partly in section of a variable transmission interconnecting the input and output shafts of a helicopter drive.

Referring now to the drawing, there is shown an input or driving shaft 10 coupled in any suitable manner to a power source or prime mover (not shown), such as an internal combustion engine, which may be adapted to impart a constant speed thereto. The driving shaft 10, which is shown with an axial opening 11, is rotatably mounted in anti-friction bearings 12, 14 suitably secured to a housing 16 (shown schematically). Adjacent the inner end of the driving shaft 10 is rigidly connected an input or sun gear 18 of an input planetary gear train comprising a plurality of planetary pinions 20 (only one of which is shown) in mesh engagement with sun gear 18 and rotatably mounted on anti-friction bearings 22, supported in turn by a planet carrier or cage 24 adapted for orbital movement around driving shaft 10. Planetary pinions 20 also mesh with internal teeth of an input ring gear 26, which is supported in housing 16 by anti-friction bearings 27.

Input cage 24 is rigidly secured to a sun gear 28 of an output planetary gear train by a bolt-nut assembly 30, the sun gear 28 being in mesh engagement with a plurality of output planetary pinions 32 rotatably mounted on anti-friction bearings 34, which are supported by a carrier or cage 36, in turn splined to a hollow driven shaft 38, which is adapted to drive the main rotor (not shown) of a helicopter. A portion of shaft 38 is shown mounted on anti-friction bearings 40, suitably supported by housing 16. The pinions 32 are shown in mesh engagement with external teeth of an output ring gear 42, which may be fixedly secured to, or integral with, the housing 16. An oil seal 44 is shown interposed between the driving and driven shafts 10, 38, respectively.

From the above it is readily seen that motion is transmitted from the driving shaft 10 to the driven shaft 38 through the input planetary gear train comprising sun gear 18, planetary pinions 20, cage 24, and output planetary gear train comprising sun gear 28 rigidly coupled to input cage 24, planetary pinion 32, and cage 36 splined to the driven shaft 38. In other words, movement is transmitted from the driving shaft to the driven shaft by means of a two-stage planetary gear train. With the output ring gear 42 always fixed as a stationary reaction, it has been the practice heretofore to vary the speed of the output shaft 38 by varying the speed of rotation of the input ring gear 26. Thus, with ring gear 26 stationary the output shaft 38 will rotate at a predetermined or basic rate of speed, while with the input ring gear rotating in one direction the output shaft speed will be reduced below the basic speed. With the input ring gear rotating in the opposite direction the shaft's speed will be raised above the basic speed. However, the above variations in output shaft speed were accomplished with total loss of the power not utilized by the output shaft, particularly at reductions in output speed.

Therefore, in order to utilize the torque or energy that would otherwise be lost during reductions in speed of the output shaft, applicant interposes between the input ring gear 26 and the input shaft 10 a variable hydraulic transmission comprising a fixed hydraulic unit 46 and a variable hydraulic unit 48 interconnected by a pair of conduits 50 for passage of liquid therethrough. The transmission, including hydraulic units 46, 48, may be of any suitable type, such as that disclosed in Orshansky Patent 2,256,324 of September 16, 1941, and inasmuch as its principle of operation is well-known, it is considered that a description thereof is unnecessary, especially since the transmission per se does not form a part of the present invention. It is, of course, understood that the positions of the fixed and variable hydraulic units 46, 48, respectively, may be reversed, and also that both units, if necessary, may be of a variable nature.

To increase the sensitivity of the hydraulic transmission a reduction gear train having a ratio of about 30 to 1 is interposed between the input ring gear 26 and the fixed hydraulic unit 46. The speed ratio, of course, may be of any other suitable figure and is not to be understood as limited to this amount. Ring gear 26 is, therefore, provided with external teeth 52, which are shown in mesh engagement with external teeth 54 of a ring gear 56, which is also provided with internal teeth 58. Ring gear 56 is rotatably supported in housing 16 upon anti-friction bearings 60.

A pinion 62, which is fixedly mounted upon a spindle 64, meshes with the internal teeth 58 of ring gear 56, spindle 64 being rotatably supported upon anti-friction bearings 66, 68 secured to a carrier or cage 70, which, in turn, is rotatably supported upon anti-friction bearings 72, 74 secured to the housing 16. A second pinion 76 is also fixedly fastened to spindle 64 and this pinion is adapted, as shown, to mesh with the stationary ring gear 77 integral with or connected to the output ring gear 42, thereby imparting orbital movement to the cage 70 upon rotation of pinion 62. Cage 70 may be secured to a shaft 78 of the fixed hydraulic unit 46 in any suitable manner, such as by a splined connection. It is thus apparent that with a speed ratio of 30 to 1 the fixed hydraulic unit shaft 78 may be rotated at 3,000 R. P. M., while the input ring gear 26 is rotated at 100 R. P. M.

Referring to the variable hydraulic unit 48, a shaft 80 thereof having a clutch 82 is rigidly coupled to a rotatable sleeve 84 mounted upon anti-friction bearings 86, 88 secured to housing 16. Sleeve 84 is shown splined internally to one end of a shaft 90, which is journalled within the sleeve bore and which has as its outer end a bevelled gear 92 for mesh engagement with another bevelled gear 94 splined to the input or driving shaft 10. Shaft 90 is also supported upon anti-friction bearing 88. It is readily apparent that shaft 80 of the variable hydraulic unit 48 will rotate continually with the driving shaft 10.

In operation, assuming that the variable hydraulic unit 48 is set at zero stroke, the shaft 80 of this unit will rotate freely with the input shaft 10 but no liquid will flow through the conduits 50 connecting this unit with the fixed hydraulic unit 46, in view of the zero stroke setting. The fixed unit 46 will be in what is known as a hydraulic lock condition. Fixed unit shaft 78 cannot rotate and therefore input ring gear 26 remains stationary. Accordingly, the speed and torque of the driving or input shaft 10 will be transmitted via the sun gear 18 to the planetary pinion 20, which revolves orbitally about the stationary ring gear 26 and causes cage 24 of the input planetary train to rotate the sun gear 28 and pinions 32, which in turn cause cage 36 of the output planetary train to drive the output shaft 38 at the predetermined basic speed. Under this assumption of zero stroke of the variable unit 48, there is no utilization of torque from the ring gear 26, there being no power splitting at this basic speed.

However, assume next that the main rotor shaft 38 is to be driven at a speed lower than the basic speed. Under this assumption the stroke of the variable hydraulic unit 48 will be set to correspond with the required output speed, whereupon liquid will be permitted to flow through the conduits 50. Accordingly, the power transmitted by the driving shaft 10 will be split into two paths, one path being traced through the double planetary train to the output shaft, as described hereinbefore, and the other path through the sun gear 18 and planetary pinions 20 to the ring gear 26 which rotates or, as it may be termed, slips therewith to rotate ring gear 56, pinions 62, cage 70 and shaft 78, which drives the fixed hydraulic unit 46 as a pump. Circulation of liquid through the conduits 50 drives the variable hydraulic unit 48 as a motor, which feeds back a predetermined amount of torque or energy, dependent upon the stroke setting, to the input shaft 10 through the bevelled gears 92, 94. This feed-back torque is normally wasted in conventional helicopter drives.

By reversing the stroke setting of the variable hydraulic unit 48, the functions of the two hydraulic units 46, 48 may be reversed to increase the output speed of the shaft 38, that is, fixed hydraulic unit 46 may be operated as a motor while variable hydraulic unit 48 is operated as a pump. In this instance, a portion of the power from the driving shaft 10 will be diverted at the bevelled gears 94, 92 to drive the variable hydraulic unit 48 via shaft 80, the main portion of the input power passing through the double planetary train to the output shaft. Liquid flow through conduits 50, developed by the variable hydraulic unit 48, drives the fixed hydraulic unit 46 as a motor which, in turn, through the reduction gear train causes ring gear 26 to rotate in a direction opposite to that described hereinbefore, thereby increasing the rotation of cage 24 and, correspondingly, that of the output shaft 38.

It is thus seen that advantages are obtained over the conventional helicopter drive by adaptation of applicant's invention to not only utilize the hitherto waste of power but also to provide an improved arrangement for varying the speed of the main rotor. While the preferred embodiment discloses a double planetary gear train interconnecting the driving and driven shafts, a single planetary gear train may be utilized instead, in which the sun gear and planet carrier may be rigidly coupled to the driving and driven shafts, respectively, and the ring gear coupled to the hydraulic transmission.

While this invention has been shown and described as embodying certain features in a driving mechanism, it is, of course, understood that various modifications may be made in the details and operating functions thereof and that the mechanism may be applied to many other and varied fields without departing from the scope of the invention, as defined in the appended claim. For example, the features of this invention may also be applied to machine tools, ships, land vehicles, and any other devices where it is desired to vary the speed ratio.

I claim:

In a driving mechanism for varying the speed of the main rotor of a helicopter, the combination with a driving and driven shaft therefor of a first stage and a second stage planetary gear train respectively connected to said driving and driven shafts, said first stage train including a sun gear rigidly connected to said driving shaft, a planetary pinion in mesh with said sun gear, a rotatable ring gear in mesh with said planetary pinion, and a revolvable cage for carrying said planetary pinion, said second stage planetary gear train including a sun gear rigidly coupled to said cage, a planetary pinion in mesh with said second stage sun gear, a stationary ring gear in mesh with said second stage planetary pinion, and a cage for carrying said second stage planetary pinion, said cage being rigidly coupled to said driven shaft, and hydro-mechanical means interposed between said ring gears and said driving shaft for varying the speed of said driven shaft, said means comprising a third ring gear in mesh with said rotatable ring gear, a third pinion in mesh with said third ring gear, a fourth pinion rigidly coupled to said third pinion and in mesh with said stationary ring gear, a third cage for carrying said third and fourth pinions, a variable hydraulic transmission rigidly connected to said third cage, and gear means for interconnecting said transmission with said driving shaft, whereby at decreased speed of the driven shaft energy derived from the driven shaft is fed back into the driving shaft and at increased speed energy derived from the driving shaft is fed into the driven shaft.

SERGEI G. GUINS.

REFERENCES CITED

The following references are of record in the file of this patent:

UNITED STATES PATENTS

| Number | Name | Date |
|---|---|---|
| 1,855,222 | Chase | Apr. 26, 1932 |
| 2,205,235 | Arnold | June 18, 1940 |
| 2,283,759 | Pollard | May 19, 1942 |
| 2,285,431 | Grossenbacher | June 9, 1942 |
| 2,327,647 | Jandasek | Aug. 24, 1943 |
| 2,354,597 | Jandasek | July 25, 1944 |

FOREIGN PATENTS

| Number | Country | Date |
|---|---|---|
| 556,470 | France | July 21, 1923 |